United States Patent [19]
Loar

[11] Patent Number: 5,470,912
[45] Date of Patent: Nov. 28, 1995

[54] POLYMERIC POWDER COATING COMPOSITIONS COMPRISING LOW MOLECULAR WEIGHT POLYETHYLENE POLYOLS

[75] Inventor: Doanld F. Loar, Washington, N.J.

[73] Assignee: AlliedSignal Inc., Morristown, N.J.

[21] Appl. No.: 94,733

[22] Filed: Jul. 22, 1993

Related U.S. Application Data

[63] Continuation-in-part of Ser. No. 28,734, Mar. 8, 1993, abandoned.

[51] Int. Cl.⁶ .............................. C08L 33/08; C08L 23/04
[52] U.S. Cl. ........................ 525/58; 525/208; 525/218; 525/221; 525/227; 525/238; 525/240; 525/241; 525/934; 524/904
[58] Field of Search ............................ 525/58, 240, 221, 525/227, 241, 208, 218, 258, 934; 524/904

[56] References Cited

U.S. PATENT DOCUMENTS 4,009,224 2/1977 Warnken .
4,174,358 11/1979 Epstein .
4,552,920 11/1985 Goto et al. .

FOREIGN PATENT DOCUMENTS 119427 9/1984 European Pat. Off. .
386358 9/1990 European Pat. Off. .
56-50941 5/1981 Japan .

Primary Examiner—W. Robinson Clark
Attorney, Agent, or Firm—Melanie L. Brown; Roger H. Criss; Colleen D. Szuch

[57] ABSTRACT

Polymeric powder coating compositions featuring improved physical properties including improved impact strength, improved adhesivity and other properties is provided by a polymeric powder coating composition which comprises: (a) polymeric powder coating resin, (b) at least one low molecular weight ethylene copolymer having a degree of saponification of at least 25%, (c) a further constituent selected from the group consisting of catalyzing agents, flow control agents, coloring agents, fillers, processing aids, wherein the weight ratio of (b) to (a) is preferably in the range of 0.01%–20% to 99.99%–80%. The powder coating composition may be applied to articles using conventional techniques. Processes for producing the polymeric powder coating compostiions, and articles comprising the same are also disclosed.

17 Claims, No Drawings

5,470,912

POLYMERIC POWDER COATING COMPOSITIONS COMPRISING LOW MOLECULAR WEIGHT POLYETHYLENE POLYOLS

RELATED APPLICATIONS

This application is a continuation-in-part application of Ser. No. 08/028,734, filed on Mar. 8, 1993, now abandoned.

FIELD OF THE INVENTION

The present invention relates to polymeric powder coating compositions. More particularly, the present invention relates to polymeric powder coating compositions which comprise a low molecular weight ethylene copolymer or terpolymer.

DESCRIPTION OF THE PRIOR ART

Powder coating compositions are known. See for example U.S. Pat. Nos. 4,009,224 and 4,552,920; "Developments in Thermoplastic Powders" by G. E. Barrett published in the proceedings of the 4th International Plastics Powder Coating Conference, London, UK, 5th and 6th of March 1974; *Chemical Abstracts* 8:73886b titled "Properties of cross linked coatings from modified ethylene-vinyl acetate polymer" in Plast. Massy 1983, Vol.(I), 56 and Japanese Patent 56050941.

SUMMARY OF THE INVENTION

In one aspect, the present invention provides an improved polymeric powder coating composition which comprises a crosslinkable or curable polymeric powder coating resin and a partially or completely saponified low molecular weight copolymer or terpolymer of ethylene and one or more monomers having a saponifiable moiety as for example vinyl acetate which preferably has a degree of saponification equal to or greater than about 25% and more preferably equal to or greater than about 50% and having a melt index of greater than 400 g/10 min. as determined by the procedure of ASTM D1239-86 using conditions 125/0.325 or a melt index which is so much greater than 400 g/10 min. under the above conditions that it can not be measured.

The composition of this invention exhibits improved properties over the polymeric powder coating resin without the inclusion of the ethylene copolymer or ethylene terpolymer which makes the composition extremely useful in powder coating applications. For example, the composition of this invention exhibits enhanced flexibility and impact resistance.

In a further aspect of the present invention, there is provided a process for forming an article of manufacture having a polymeric powder coating, which process comprises the steps of:

a) melt blending a crosslinkable or curable polymeric powder coating resin and a completely or partially saponified low molecular weight copolymer or terpolymer of ethylene and a monomer having a saponifiable moiety as for example vinyl acetate which preferably has a degree of saponification equal to or greater than about 25% and more preferably equal to or greater than about 50% and having a melt index of greater than 400 g/10 min. as determined by the procedure of ASTM D1239-86 using conditions 125/0.325 or a melt index which is so much greater than 400 g/10 min. under the above conditions that it can not be measured to form a melt blend of said resin and said copolymer or terpolymer;

applying said blend to a surface of a substrate to form a coated substrate; and curing or crosslinking said resin in said coating to form said article of manufacture having a polymeric powder coating.

Another aspect of the present invention is an article which comprises a body coated with a polymeric coating wherein said polymeric coating comprises a crosslinkable or curable polymeric resin material and a partially or completely saponified low molecular weight copolymer or terpolymer of ethylene and a monomer having a saponifiable moiety such as vinyl acetate which preferably has a degree saponification equal to or greater than about 25% or more and more preferably equal to or greater than 50% and as a melt index of greater than 400 g/10 min. as determined by the procedure of ASTM D1239-86 using conditions 125/0.325 or a melt index which is so much greater than 400 g/10 min. under the above conditions that it can not be measured, where said resin has been cured or crosslinked.

These and other aspects of the present invention will become more apparent in light of the foregoing detailed description.

DETAILED DESCRIPTION OF THE INVENTION

The present invention provides improved polymeric powder coating compositions which comprises two essential constituents. One essential constituent is one or more polymeric powder coating resins. Any crosslinkable or curable polymeric powder coating resin can be used in the practice of this invention. Illustrative of such resins are conventional crosslinkable or curable polymeric powder coating resin. Such coating resins which may be used and are presently known to the art and include, but are not limited to: epoxy coating resins, polyester coating resins, acrylic coating resins and the like. Conventional polymeric powder coatings may also include polyisocyanate crosslinked polyester coating resins, triglycidyl isocyanurate crosslinked polyester coating resins, polyester epoxy "hybrid"-type coating resins, triglycidyl isocyanurate crosslinked acrylic-type coating resins, polyisocyanate crosslinked acrylic-type coating resins, hydroxy alkylamine crosslinked polyester coating resins, hydroxy alkylamide crosslinked acrylic coating resins, amine crosslinked epoxy coating materials, anhydride crosslinked epoxy coating resins, tetramethoxymethyl glcoluril crosslinked acrylics or polyesters, and uretdione crosslinked polyester-type coating resins. The resins may be either aromatic or aliphatic, as well as either blocked or unblocked materials, and for example, include polyisocyanate-type materials blocked with caprolactam or methyl ethyl ketoxime and.

Preferred powder coatings resins are acrylics, epoxies and polyesters and more preferred resins are polyesters The second essential constituent of the composition of this invention is a partially or completely saponified low molecular weight copolymer or terpolymer of ethylene and a monomer having a saponifiable monomer. Such useful copolymers and terpolymers (hereinafter referred to as "copolymers") may vary widely. Illustrative of such copolymers are copolymers of ethylene and saponifable monomers which can be saponified or hydrolyzed to a vinyl alcohol moiety such as vinyl acetate; vinyl formate, vinyl benzoate, vinyl propionate and the like. In the preferred embodiments of the invention the saponifiable monomer is vinyl acetate.

In addition to the essential recurring monomeric groups derived from ethylene and the monomer having the saponifiable moiety, the copolymer may include other types of recurring monomeric units. Illustrative of such monomeric units are those derived from α,β-unsaturated monomers such as olefins as for example α-methyl styrene, styrene, propylene, butylene, isobutylene and α-methylpentene, acrylic acid, methacrylic acid, α-ethylhexyl acrylate, ethyl acrylate, butyl acrylate, glycidyl acrylate, acrylonitrile, acrylamide, methacrylamide and the like. The preferred additional monomeric unit is acrylic acid.

The copolymer has a number average molecular weight equal to or less than 4000. The number average molecular weight is preferably equal to or less than about 3000 and is more preferably equal to or less than about 2700.

The degree of saponification of the saponifiable moiety is equal to or greater than about 25%. The degree of saponification is preferably at least about 35%, more preferably at least about 50% and most preferably at least about 90%.

The relative weight percent of recurring monomeric units in the copolymer may vary widely. The copolymer preferably comprises from about 60 to about 99% by weight of recurring monomeric units derived from ethylene, from 1 to about 40% by weight of recurring monomeric units derived from monomers having a saponifiable moiety and saponified derivatives thereof, from 0 to about 39% by weight of monomeric units derived from a third constituent, wherein all weight percents are based on the total weight of monomeric units in the copolymer. In the preferred embodiments of the invention, the copolymer includes from about 75 to about 95% by weight of monomeric units derived from ethylene, from 1 to about 25% of monomeric units derived from a monomers having a saponifiable moiety or a saponified derivative thereof and from 0 to about 24% of monomeric units derived from another monomer. In the more preferred embodiments of the invention, the copolymer consists essentially of two types of recurring monomeric units, from about 5 to about 20% by weight of monomeric units derived from an α,β-unsaturated monomer having at least one saponifiable moiety and from about 80 to about 95% by weight of monomeric units derived from ethylene and in the most preferred embodiments of this invention from about 10 to about 15% by weight of monomeric units derived from α,β-unsaturated monomer having at least one saponifiable moiety or a saponified derivatives thereof and from about 85 to about 90% by weight of monomeric unit derived from ethylene.

The copolymer of this invention has a melt index of greater than 400 g/10 minutes, as determined by the procedure of ASTM D1238-86 using conditions 125/0.325 or a melt index which is so much greater than 400 g/10 minutes under the above conditions that it can not be measured. In the preferred embodiments of the invention, the melt index of the copolymer is equal to or greater than about 700 g/10 minutes. The melt index of the copolymer is more preferably equal to or greater than about 800 g/10 minutes and is most preferably so high that it is not measureable under the aforementioned conditions (i.e. has a melt index of greater than 900 g/10 minutes under the foregoing conditions.)

The ethylene copolymers which find use in accordance with the present teaching may be produced by conventional process, or may be a obtained commercially as a unsaponified copolymer and then at least partially hydrolyzed or saponified in accordance with conventional techniques, or in the alternative may be obtained commercially as partially hydrolyzed or saponified copolymers. For example, one such conventional process which may be used is by co-condensing appropriate stochiometric quantities of a low molecular weight ethylene with vinyl acetate in the presence of a catalyst and a chain terminating agent to produce a copolymer product. Subsequently, the copolymer product may be hydrolyzed or saponified to an appropriate degree in conjunction with a stochiometric amount of at least one hydroxide, such as sodium hydroxide or potassium hydroxide. One commercial source is from the ACtol(tm) Performance Additives Division of Allied-Signal Inc. under the trade designation ACtol(tm).

The partially or completely saponified ethylene copolymers (and terpolymers) useful in the present invention comprise one or more of the following functional groups: hydroxyl, ester, and carboxyl. It is preferred that the ethylene copolymers (and terpolymers) have a hydroxyl number in excess of 50, and preferably have a hydroxyl number of about 75 or greater. The hydroxyl number may be determined by conventional techniques by titrating a sample with sodium hydroxide.

The composition of this invention may also include various other constituents which are used in polymeric powder coating composition. Further constituents which may find use in the improved polymer coating compositions according to the present invention include catalyzing agents, flow control agent, coloring agents such as pigments or dyes, fillers, processing aids such as silica, catalysts, matting agent, and other conventional processing aid and additives known to those of ordinary skill in the art.

Conventional organic and inorganic pigments which may be included in the compositions of the present invention include carbon black, ultra marine blue, dyes based on phthalocyanide, titanium dioxide, cadmium sulfide, cadmium sulfide selenide, nigrosine and the like. Generally, such conventional pigments when included comprise up to about 50 weight percent or less of the total composition and preferably 30 weight percent or less.

Conventional flow control agents may be utilized. Such flow control agents include hexyl acrylates.

Fillers conventionally used in powder coating compositions may be incorporated into the composition of the present invention and include both organic and inorganic type fillers. By way of example inorganic fillers which may be used include asbestos, calcium silicate, calcium metasilicate, aluminum silicate, amorphous silica, precipitated silica, fumed silica, magnesium carbonate, kaolin, dolomite, chalk, feldspars, mica, barium sulfate, calcium carbonate Blanc Fixe and the like.

Conventional catalyzing agents (which are known to the art and sometimes referred to as "accelerators") known to improve the cross-linking and/or curing of the polymeric powder coating resin material may be incorporated in the compositions according to the present invention in conventional amounts. Generally, these catalyzing agents lower the required temperature in applications wherein the coating composition is cross linked or cured by exposure to heat and/or reduce the time interval at an elevated temperature at which the coated article needs be exposed. Such conventional catalysts include, but are not limited to, stannous octoate, dibutyl tin dilaureate, dibutyl tin diacetate and the like.

Conventional materials which are used to control the surface appearance of the polymeric coating include matting agents which limit the surface gloss. Such matting agent materials include waxes, silicas, polytetrafluoroethylene, as well as other conventional materials not particularly denoted here.

Processing aids which improve the process ability, and in the formation of the polymeric coating may be included in the compositions. By way of example, silica is known to the art as a processing aid useful in improving the free-flow characteristics of the particulate polymeric powder coating composition. A further conventional processing aid includes benzoin which is known to reduce pinhole formation during crosslinking and/or curing of the polymeric constituents in the coating composition. Further conventional processing aids not particularly denoted here may be incorporated in the compositions according to the present invention.

In the formulation of the improved polymer powder coating compositions of the present invention, it is to be understood that the low molecular weight ethylene copolymers (and terpolymers) as described above are substituted for a portion of the conventional polymeric powder coating resin in a conventional polymeric powder coating composition and that such substitution results in improvements in physical characteristics including improvements in impact strength, flexibility and inter facial adhesion as compared to a composition where no substitution has been made. In determining the amount of the conventional polymeric powder coating resin which is to be substituted by the low molecular weight ethylene copolymers and terpolymers taught herein, it will be clearly understood by the skilled practitioner that conventional experimental techniques wherein various amounts of the low molecular weight ethylene copolymers are incorporated into conventional polymer powder coating compositions and the resultant physical properties of the cured/crosslinked composition are subsequently evaluated is a very useful method for determining the optimum amount of substitution of low molecular weight ethylene copolymers within any conventional polymer powder coating composition. From such a determination, the optimal degree of substitution for a desired set of physical properties may be particularly evaluated.

Preferably, the amount of low molecular weight ethylene copolymers substituted for an amount of conventional polymeric powder coating resin is such that the weight ratio of the low molecular weight ethylene copolymer to the conventional polymeric powder coating resin is in the range of from about 0.01% to about 20% to 99.99% to about 80%, respectively. More preferably, the relative weight ratios of these respective constituents is in the range of from about 0.01% to about 15% to about 99.99% to about 85%.

The inventor has also noted that in certain polymeric powder coating compositions as taught in the present specification necessitates that the amount of the conventional catalyzing agent used in the composition may need to be increased if it is desired that increased rates of cross-linking/curing of the composition is desired. It has been observed that with the use of low molecular weight copolymers (and terpolymers) which have higher equivalent weights (which are a function of the hydroxyl or acid number), lesser amounts of conventional catalyzing agents need be added to the compositions. Such increases may be determined experimentally by routine evaluative techniques, but it is not expected that more than about a 35% by weight increase in the amount of the conventional catalyzing agent will be required.

The improved polymer powder coating compositions according to the present invention may be used in forming polymeric coatings on articles in accordance with conventional techniques. In an exemplary conventional process, the constituents of the composition are measured out and mixed in a suitable apparatus and subsequently the blended constituents are provided to the throat of a kneader or extrude apparatus which heats and blends the constituents into a mass which mass is subsequently extruded into any desired form. Extruded strands, films, ribbons, or the like are then chopped, ground, or otherwise comminuted into a fine powder having a size of about 200 microns or less, preferably 120 microns and less.

In a process described above wherein a single or twin extruder is used to blend the constituents, the temperature of the extruder barrel should be sufficiently high to insure that the copolymer is melted. It is preferred that the initial zone of the extruder following the feed inlet be at a temperature of at least about 5° C. to about 10° C. above melting point of the copolymer to insure the rapid melting of the same.

The powder composition of this invention may be applied to the surface of an article in any conventional manner known to the art. One such manner utilizes a corona discharge gun wherein the powder is imparted with a negative electrostatic charge and wherein the article is grounded, and the negatively charged powdered particles are then propelled at the grounded surface where the attraction of the oppositely charged particles induces their retention at the surface. Subsequently, the coated surface is the placed in a oven at a elevated temperature for a sufficient time to ensure the desired degree of cross linking and/or curing of the polymeric powder coating resin within the powder coating composition. In the alternative, other cross-linking or curing means such as infrared waves may be used.

Another manner useful production process utilizes a fluidized bed. In such process, the surface upon which the polymeric powder is to be coated is heated and placed in a chamber proximate the fluidized bed. Particles are blown from the bed, and due to electrostatic attractive forces and/or the rapid action of the heated article in melting the powder, are collected upon the heated surface and fused.

In a third alternative manner of production known to the practitioner as "tribocharging", an electrostatic charge generated by frictional forces is imparted to the polymeric powder coating to be deposited. Then due to electrostatic forces, the powder is attracted to the surface and thereupon retained during a subsequent curing and/or cross linking step, usually via exposure to an elevated temperature in an oven.

In each of these conventional powder deposition methods, the polymeric powder coating on the surface is subsequently cross linked and/or cured so to fuse the particles and to form a continuous polymeric coating. Such may be accomplished in several manners as is conventionally known to the art.

In one popular manner, the surface of article which has a polymeric powder coating is introduced into a dry circulating air oven wherein the surface is retained at an elevated temperature for a sufficient time so to effect an acceptable degree of curing and/or cross-linking.

In a second alternative method, articles and/or surfaces are provided with a polymeric powder coating and then exposed to electromagnetic radiation, particularly in the infrared spectra region. Such exposure causes the curing and/or crosslinking of the polymeric constituents of the polymeric powder coating composition on the surface to form into a continuous layer.

The articles or surfaces which are provided with a polymeric powder coating according to the present invention may be used in the construction of a broad range of useful items. For example, wherein a cold rolled steel sheet or panel is provided with a cured/cross linked powder coating in accordance with the teaching herein, the same may be used to fabricate articles which include, but are not limited, to furniture, cabinets, shelving, partition panels, panels for use in automotive, aerospace and aeronautical applications, containers, boxes, fencing, housing and containers for electro and/or mechanical apparatus such as electro components, mechanical components, pipes, wires, cables, including the formation of one or more layers on a pipe and/or wire or cable construction, as well as other items not particularly denoted here.

An advantageous feature of the present invention is best realized in the post formation of a flat sheet or panel i.e., such as that formed of a coated cold rolled steel panel by bending or otherwise deforming the same, such as would be realized in bending the panel to a 90° or greater angle. As is appreciated by the practitioners in the art, such an action would cause extreme stress within the metal and most particularly in the polymeric coating at the line of the bend. Advantageously, the compositions of the present invention are known to the particularly resistant to breaking or rupturing at such stress locations due to observed increased flexibility of the coating. Such is particularly beneficial wherein the final appearance of the formed item or article is of concern and further provides the assurance of a continuous polymeric layer which ensures that the underlined sheet panel or other material is isolated from potentially corrosive effects in the environment of use.

The invention is more easily understood by reference to specific embodiments which are representative examples according to the teachings of the instant invention. It must be understood however, that the specific embodiments discussed herein are provided only for the purpose of illustration, and not by way of limitation, and it is to be further understood that the invention may be practiced otherwise than specifically described and yet be within the inventive scope.

EXAMPLES

Various compositions of this invention containing partially or completely saponified ethylene/vinyl acetate copolymer were formed. The copolymers were obtained from AlliedSignal Inc., under the tradenames "ACtol®60"(A60), "ACtol®65"(A65), "ACtol®70"(A70) and "ACtol®80"(A80). Properties of the ethylene copolymers used in the blends are set forth in the following Table I.

TABLE I

| | TYPE | | | |
|---|---|---|---|---|
| | A60 | A65 | A70 | A80 |
| | Functional Groups | | | |
| | Hydroxyl | Hydroxyl Ester | Hydroxyl | Hydroxyl Carboxyl |
| Melting Range (°C.) | 71–86 | 40–65 | 95–105 | 74–86 |
| Avg. Molecular Wt. | 2400 | 2400 | 2500 | 2500 |
| Hydroxyl Number (ASTM E222) | 145–185 | 85–120 | 90–120 | 75–115 |
| Acid Number (mgKOH/g) | NIL | NIL | NIL | 40 |
| Equivalent Weight | 300–390 | 465–660 | 470–625 | 485–750 (Hydroxyl) 1194 |

TABLE I-continued

| | TYPE | | | |
|---|---|---|---|---|
| | A60 | A65 | A70 | A80 |
| | Functional Groups | | | |
| | Hydroxyl | Hydroxyl Ester | Hydroxyl | Hydroxyl Carboxyl |
| Hardness (dmm) | 3–4 | 16.5 | 1.6–1.8 | (Carboxyl) 8.3 |
| Viscosity (cps @ 140° C.) | 725 | 1100 | 725 | 625 |
| Degree of Saponification (%) | >95 | 50 | >95 | >95 |

The constituents of the respective compositions were weighed out and introduced into a blender where they were dry blended to form a well mixed dry particulate blend which was essentially homogeneous. Components of the blend and their relative amounts are set forth in the following Tables II, III and IV. For comparison purposes, test compositions which did not include ethylene copolymer were also prepared. In the Tables, the compositions of this invention are identified by letters A to J, and the comparison compositions are identified by numbers 1 to 4.

TABLE II

| | TEST FORMULATIONS | | | |
|---|---|---|---|---|
| COMPONENT | 1 | A | B | C |
| Polyester Resin 1[1] (g) | 420 | 398 | 388 | 377 |
| Curing Agent1[2] (g) | 21.5 | 22.2 | 22.6 | 22.2 |
| A 80 (g) | 0 | 21.0 | 31.4 | 42.0 |
| Flow Control Agent[3] (g) | 7.5 | 7.5 | 7.5 | 7.5 |
| Benzoin[4] (g) | 1.5 | 1.5 | 1.5 | 1.5 |
| Titanium Dioxide[5] (g) | 216 | 216 | 216 | 216 |
| Silica[6] (g) | 20 | 20 | 20 | 20 |
| Blanc Fixe[7] (g) | 91 | 91 | 91 | 91 |

TABLE III

| | TEST FORMULATIONS | | | | |
|---|---|---|---|---|---|
| COMPONENT | 2 | D | E | F | G |
| Polyester Resin 2[8] (g) | 353 | 334 | 325 | 315 | 305 |
| Curing Agent 2[9] (g) | 85 | 95 | 96 | 98 | 99 |
| A 70 (g) | 0 | 9 | 17 | 26 | 34 |
| Titanium Dioxide[5] (g) | 216 | 216 | 216 | 216 | 216 |
| Blanc Fixe[7] (g) | 91 | 91 | 91 | 91 | 91 |
| Flow Control Agent[3] (g) | 4.1 | 4.1 | 4.1 | 4.1 | 4.1 |
| Benzoin[4] (g) | 8.2 | 8.2 | 8.2 | 8.2 | 8.2 |
| Silica[6] (g) | 10 | 10 | 10 | 10 | 10 |

TABLE IV

| | TEST FORMULATIONS | | | | |
|---|---|---|---|---|---|
| COMPONENT | 3 | 4 | H | I | J |
| Polyester Resin 2[8] (g) | 404 | 358 | 351 | 333 | 324 |
| Curing Agent[10] (g) | 88 | 78 | 100 | 85 | 89 |
| A 60 (g) | 0 | 0 | 39 | 18 | 34 |

TABLE IV-continued

| | TEST FORMULATIONS | | | | |
|---|---|---|---|---|---|
| COMPONENT | 3 | 4 | H | I | J |
| Titanium Dioxide [5] (g) | 246 | 216 | 246 | 216 | 216 |
| Blanc Fixe [7] (g) | 0 | 0 | 0 | 91 | 91 |
| Flow Control Agent [3] (g) | 5 | 4.5 | 5 | 4.5 | 4.5 |
| Silica [6] (g) | 10 | 0 | 0 | 4.5 | 4.5 |

In the Tables II, III and IV:
1. "Polyester Resin 1" is a conventional unsaturated polyester having carboxyl functionalities obtained from EMS under the tradename "U76-12".
2. "Curing Agent 1" is a conventional unsaturated polyester believed to be a hydroxy alkylamide obtained from Rohm & Hass under the tradename "Primid XL 552".
3. "Flow Control Agent" which is believed to a an ethyl acrylate obtained from the Monsanto under the tradename "Modaflow Powder III"
4. "Benzoin" is benzoin obtained from Eastman Kodak.
5. "Titanium Dioxide" is titanium dioxide obtained from E. I. duPont de Nemors Co. under the tradename "R900".
6. "Silica" is silica obtained from Cabot Corporation under the tradename "Cabot TS-530".
7. "Blanc Fixe" is barium sulfate obtained from Sachtleben under the tradename "Blanc Fixe F".
8. "Polyester Resin 2" is a conventional unsaturated polyester having hydroxyl functionality obtained from Cargill under the tradename "Cargill 3000".
9. "Curing Agent 2" is a conventional curing agent used with unsaturated polyester resins believed to be a blocked polyisocyanate obtained from Huls AG under the tradename "BF 1530".
10. "Curing Agent 3" is a conventional curing agent used with unsaturated polyester resins believed to be a caprolactam blocked polyisocyanate obtained from Cargill under the tradename "Cargill 2400".

Subsequently, the dry particulate blend was provided to the inlet throat of a Hake twin screw extrude having two standard duty mixing screws. The temperature profile across the extrude was set as follows: zone 1, 85 C; zone 2, 115° C.; zone 3, 115° C. The throat was water cooled and the die temperature was set at about 110° C. The screws rotated at a speed of approximately 40 rum.

The extruded formulation exiting the die was cooled, and subsequently comminuted to a fine powder through a 140 mesh sieve. The particle size of the powder was not in excess of about 106 microns.

The fine powder of the respective formulation was then provided to a Ransberg type 706 cup gun operated at 70 kV, which was used to spray cold rolled steel panels so to provide a dry film thickness of 2.0–2.5 mils.

The panels were then baked at a temperature of 182° C. for 30 minutes to cure the panels. The panels were evaluated in accordance with conventional test protocols which included the following: Pencil Hardness according to the the Standard Test Method for Film Hardness by Pencil Test, ASTM D 3363 (1980); Adhesion according to the Standard Test Method for Measuring Adhesion by Tape Test, ASTM D3359 (1987); Impact Resistance according to the Standard Test Method for Resistance of Organic Coatings to the Effects of Rapid Deformation (Impact), ASTM D2794 (1984); Flexibility according to the Standard Method for Coating Flexibility of Repainted Sheet, ASTM D 4145 (1983); Gloss according to the Standard Method for Specular Gloss, ASTM D 523 (1985); Overbake Resistance in accordance with the Standard Test Method for Yellowness Index of Plastics, ASTM D 1925 (1977), as well as resistance to softening to organic solvents by "double rubbing" a respective sample with methyl ethyl ketone ("MEK") to evaluate if the respective sample exhibited softening.

All testing was performed on the cold rolled steel sheet as indicated except that impact resistance was evaluated for all compositions on 22 gage steel treated with a conventional pretreatment agent, "Bonderite~901" which is commercially available from the Henkel Corp. The results are set forth in the following Table V.

TABLE V

| | FORMULATIONS AND RESULTS | | | | | | | | |
|---|---|---|---|---|---|---|---|---|---|
| COMPONENT | 1 | A | B | C | 2 | D | E | F | G |
| Impact Resistance (Gardner, in./lb.) | | | | | | | | | |
| (a) Direct | 120 | >160 | >160 | >160 | 60 | 60 | 60 | 100 | 140 |
| (b) Indirect | 100 | >160 | >160 | >160 | <40 | <40 | <40 | <40 | <40 |
| Adhesion (ASTM d3359) | 5B | 5B | 5B | 5B | 5B | 5B | 5B | 5B | 5B |
| Film Hardness (ASTM D3363) | — | — | — | — | F | F | F | F | HB-F |
| MEK Resistance 100 Double Rubs | — | — | — | — | Pass | Pass | Pass | Pass | Pass |
| 60% Gloss | 84 | 73 | 67 | 59 | 87 | 86 | 79 | 65 | 51 |
| Flexibility** | — | — | — | — | — | — | — | — | — |
| Overbake Resistance* | | | | | | | | | |
| 45 min. at 182 deg. | — | — | — | — | — | — | — | — | — |
| 1 Hr. at 182 deg. C. | — | — | — | — | — | — | — | — | — |

TABLE V-continued

| | FORMULATIONS AND RESULTS | | | | |
|---|---|---|---|---|---|
| COMPONENT | 3 | 4 | H | I | J |
| Impact Resistance (Gardner, in./lb.) | | | | | |
| (a) Direct | 130 | 80 | >160 | >160 | >160 |
| (b) Indirect | <40 | <40 | <40 | >160 | <60 |
| Adhesion (ASTM d3359) | 5B | 5B | 5B | 5B | 5B |
| Film Hardness (ASTM D3363) | F | HB | F | HB | HB |
| MEK Resistance 100 Double Rubs | Pass | Pass | Pass | Pass | Pass |
| Flexibility | >1T | >2T | 0 T | >2T | >2T |
| Gloss | 84 | 88.5 | 72.5 | 78 | 76 |
| Overbake Resistance | | | | | |
| 45 min. at 182 deg. | −1.03 | 0.79 | 0.812 | 0.979 | 1.099 |
| 1 Hr. at 182 deg. C. | −1.35 | 0.018 | 0.614 | 2.49 | 3.186 |

* Flexibility: (T Bend)?
* Overbake Resistance: Units per ΔYI

EXAMPLE 2

Compositions H and I were also evaluated for recoatability wherein a formulation was sprayed onto cold rolled steel sheet panels and baked at 182° C. and withdrawn at intervals of 10, 20 and 30 minutes. All of the withdrawn panels were allowed to cool to room temperature and then provided with a further coat of the same formulation used to provide the first coat and then reintroduced into the oven and rebaked for a further 30 minutes at 182° C. to ensure cross linking/curing of the subsequent coat. The panels were then removed and allowed to cool to room temperature; the coatings were then crosshatched to evaluate the inter layer adhesion. Test results are set forth in the following Table VI.

TABLE VI

| | Adhesion* Composition | Adhesion* |
|---|---|---|
| Parameter | H | I |
| Bake Time (min) | | |
| 10 min. | 5B | 5B |
| 20 min. | 5B | 5B |
| 30 min. | 5B | 5B |

Adhesion* per ASTM D3359

What is claimed is:

1. A polymeric powder coating composition comprising:
   (a) polymeric powder coating resin selected from the group consisting of unsaturated polyester coating resin and acrylic coating resin, and
   (b) at least one low molecular weight ethylene copolymer having a degree of saponification of at least 25%, and having a melt index of greater than 400 g/min. as determined by the procedure of ASTM D1239-86 using the conditions 125/0.235 and having a number average molecular weight equal to or less than about 4000.

2. The polymeric powder coating composition of claim 1 wherein said polymeric powder coating resin is unsaturated polyester coating resin.

3. The polymeric powder coating composition of claim 1 wherein said polymeric powder coating resin is acrylic coating resin.

4. The polymeric powder coating composition of claim 2 wherein said unsaturated polyester coating resin is selected from the group consisting of polyisocyanate crosslinked polyester coating resin, triglycidyl isocyanurate crosslinked polyester coating resin, hydroxy alkylamine crosslinked polyester coating resin, tetramethoxymethyl glcoluril crosslinked polyester coating resin, and uretdione crosslinked polyester-type coating resin.

5. The polymeric powder coating composition of claim 3 wherein said acrylic coating resin is selected from the group consisting of triglycidyl isocyanurate crosslinked acrylic-type coating resin, polyisocyanate crosslinked acrylic-type coating resin, hydroxy alkylamide crosslinked acrylic coating resin, and tetramethoxymethyl glcoluril crosslinked acrylic coating resin.

6. The polymeric powder coating composition of claim 1, wherein the weight ratio of(b) to (a) is in the range of about 0.01 percent to about 20 percent to about 99.99 percent to about 80 percent based on the total weight of (a) and (b).

7. The polymeric powder coating composition of claim 6 wherein the weight ratio of(b) to (a) is in the range of about 0.01 percent to about 15 percent to about 99.99 percent to about 85 percent.

8. The polymeric powder coating composition of claim 1 wherein said melt index is equal to or greater than about 700 g/10 minutes.

9. The polymeric powder coating composition of claim 8 wherein said melt index is equal to or greater than about 800 g/10 minutes.

10. The polymeric powder coating composition of claim 9 wherein said melt index is greater than about 900 g/10 minutes.

11. The polymeric powder coating composition of claim 1 wherein the degree of saponification of the low molecular weight ethylene copolymer is at least about 50 percent.

12. The polymeric powder coating composition of claim 1 wherein the degree of saponification of the low molecular weight ethylene copolymer is at least about 90 percent.

13. The polymeric powder coating composition of claim 1 wherein at least one low molecular weight ethylene copolymer is an ethylene vinyl acetate copolymer having a number average molecular weight equal to or less than about 3,000.

14. The polymeric powder coating composition of claim 1 wherein the at least one low molecular weight ethylene copolymer is an ethylene/vinyl acetate terpolymer which further comprises a copolymerized constituent selected from the group consisting of: acrylic acid, styrene, methacrylic acid, 2-ethylhexylacrylate, ethyl acrylate, butyl acrylate, methylstyrene, glycidyl acrylate, acrylonitrile, and methacrylamide, and having a number average molecular weight equal to or less than about 3,000.

15. The polymeric powder coating composition of claim 14 wherein the low molecular weight ethylene/vinyl acetate terpolymer is a low molecular weight ethylene/vinyl acetate/ acrylic acid terpolymer having a number average molecular weight equal to or less than about 3,000.

16. A process for manufacturing an article having a polymeric powder coating composition comprising the steps of:

(a) melt blending the composition of claim 1 and forming a comminuted powder therefrom;

(b) coating a surface of an article with said comminuted powder; and (c) curing the powder coating to form a polymeric coating on said surface of said article.

17. An article which comprises a surface coated with at least one polymeric layer formed of the polymeric powder coating composition of claim 1.

* * * * *